United States Patent

Gerke et al.

[15] 3,665,110

[45] May 23, 1972

[54] SWITCHING ARRANGEMENT FOR CENTRALLY CONTROLLED TELEPHONE EXCHANGE INSTALLATION

[72] Inventors: Peter Gerke, Grafelfing; Karl Rutkowski, Pullach; Helmuth Joachim Bock, Munich; Helmut Palsa, Dachau, all of Germany

[73] Assignee: Siemens Aktiengesellschaft, Berlin and Munich, Germany

[22] Filed: Oct. 18, 1968

[21] Appl. No.: 768,753

[30] Foreign Application Priority Data

Oct. 19, 1967 Germany ....................P 15 37 849.1

[52] U.S. Cl. ....................179/18 EA

[51] Int. Cl. ....................H04g 3/56

[58] Field of Search.........179/18.3 C, 18 ES, 18 FC, 18 EB, 179/18 E, 18 EA; 340/172.5

[56] References Cited

UNITED STATES PATENTS

| | | | |
|---|---|---|---|
| 3,170,041 | 2/1965 | Spellnes | 179/18 EA |
| 2,985,865 | 5/1961 | Merz | 340/172.5 |
| 3,113,184 | 12/1963 | Hersey | 179/18 E |
| 3,293,612 | 12/1966 | Ling | 340/172.5 |
| 3,312,945 | 4/1967 | Berezin et al. | 340/172.5 |
| 3,409,742 | 12/1968 | Winter | 179/18 EB |
| 3,198,887 | 8/1965 | Brooks et al. | 179/18.3 C |
| 3,206,553 | 9/1965 | Lucas et al. | 179/18.3 C |
| 3,286,037 | 11/1966 | Kerr et al. | 179/18.3 C |
| 3,335,230 | 8/1967 | Rettig et al. | 179/18.3 C |

*Primary Examiner*—Kathleen H. Claffy
*Assistant Examiner*—Randall P. Myers
*Attorney*—Birch, Swindler, McKie & Beckett

[57] ABSTRACT

A switching arrangement for long distance telephone exchange installations with central apparatus having a central control means and individual apparatus, the latter being divided into different groups, each group having a plurality of differently functioning individual apparatus. Individual buffer storage and/or code conversion systems are assigned to each group and is connected thereto over a transmission line of a first type transmitting parallel coded information. Each group is connected over a joint transmission line of a second type having series coded information.

6 Claims, 3 Drawing Figures

FIG. Ib
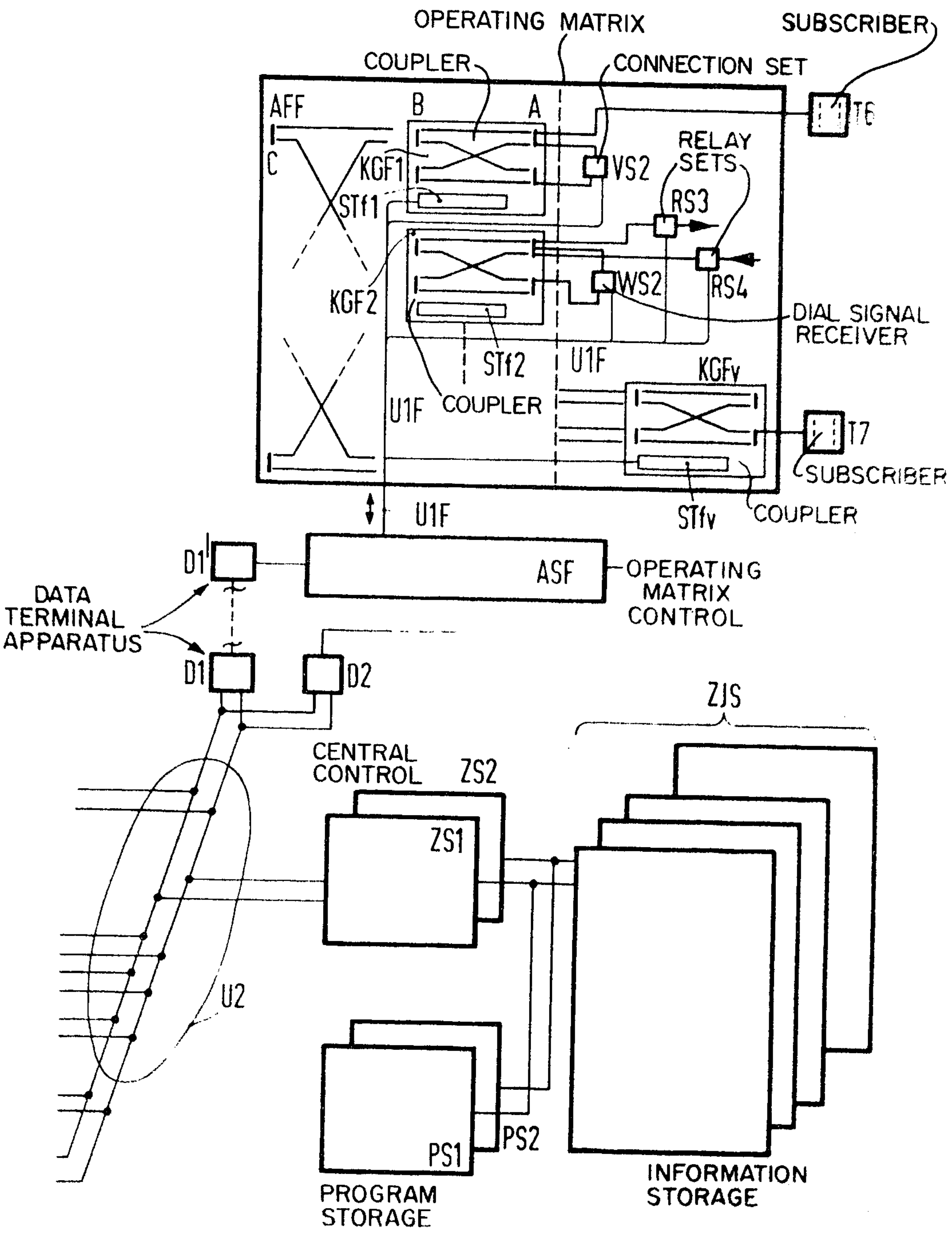

SWITCHING ARRANGEMENT FOR CENTRALLY CONTROLLED TELEPHONE EXCHANGE INSTALLATION

CROSS REFERENCE TO RELATED APPLICATION

Applicants claim priority from corresponding German patent application Ser. No. S 112.476, filed on Oct. 19, 1967.

BACKGROUND OF THE INVENTION

1. Field of the Invention

The invention relates to a switching arrangement having particular utility in long distance telephone installations. It functions to economically subdivide an extensive centrally controlled exchange installation into partial exchange installations to enable development of relatively narrowly dimensioned subscriber areas having correspondingly short average subscriber lines.

2. Description of the Prior Art

Switching arrangements for telephone installations are known in the prior art wherein all control functions are carried out by a central control means. A transmission line is connected between the central control means and exchange technical switching systems of a telephone installation. The exchange technical switching systems are arranged according to their different functions and effects, and are developed separately from one another. It comprises, for example, a switching matrix with path finding and setting systems, an identification means, subscriber connection circuits, dial signal receivers, registers, connection sets for internal and external connections and the like.

A central control means to which a central information storage means and a central program storage means are assigned has the task to receive information from the exchange technical switching systems, to process it logically according to the program, and to transmit it as control commands to the exchange technical switching systems in question. In this connection the central control means is developed with regard to switching techniques in such a way that it is in a position to carry out successively all arising tasks within the shortest time periods. Such a central control means is advantageous because it combines therein all switching technical requirements for all logical functions of the telephone installation. Further, due to its high operational speed, only one is provided principally per telephone installation, considerably restricting the expenditures otherwise customary in de-centralized controlling. This justifies the installation of electronic switching devices of relatively high cost with extremely short switching times in the central control mechanism.

However, this high operational speed of the central control mechanism can be influenced by the duration of information transmission from the above mentioned exchange technical switching systems to the central control means and vice versa (control commands). For this reason care must be taken that, through use of a suitable kind of transmission line and transmission method and, in particular, through transmission and receiving systems with correspondingly brief switching times in the exchange technical switching systems, the high operational speed of the central control means is effectively utilized.

It is known in this regard to develop the transmission lines as multi-conductor lines and to carry out information transmission in both directions (to and from the central control means) in a parallel code transmission method. It is further known to exchange the information over a few conductors of a transmission line using a series code transmission method, which possesses a correspondingly high transmission frequency. In these cases, connection systems are provided which connect the individual exchange technical switching systems, as needed, individually, in succession, to the transmission line leading to the central control means. It is also known that, instead of such connection systems, information transmission may be carried out in both directions according to a time multiplex transmission method.

The previously indicated different known solutions have the common disadvantage that the transmission lines and methods, and the transmission and receiving switching devices in the individual exchange technical switching systems must be adapted to the central control means with regard to their operational speed, and must accordingly be of high cost as regards switching techniques.

In this connection attention is to be invited to U.S. Pat. No. 3,113,183, wherein, among other things, a switching matrix is shown which is subdivided into several components, to the individual components whereof buffer storage means are assigned. Among other things, these components are exchange technical switching systems in the sense of the preceding explanation. The buffer storage means serve to receive the setting information emitted by the central control means in a very much shorter time than the components of the switching matrix in question would ever be able to. The central control means is connected with the buffer storage means for a very short time only, whereas for the transmission of received setting information to the switching matrix a considerably longer time period is available, during which the central control means can already have been connected successively with several other buffer storages of other components of the switching matrix for the same purpose. However, these buffer storages represent a large expenditure, as they are provided individually per component of the switching matrix.

It is further known to employ storage means, provided for information transmission between individual apparatus such as pulse generators (these are exchange technical systems in the above sense)-and central apparatus (converter), which serve for temporary storage and recoding of information jointly for several individual apparatus. In this connection one connection possibility each is provided between the central apparatus and the storage means and between these and the individual apparatus. Transmission lines of a first type and transmission lines of a second type correspond to these connection possibilities.

SUMMARY OF THE INVENTION

The invention concerns a switching arrangement for long distance telephone exchange installations with central apparatus comprising a central control means and individual apparatus; the individual apparatus being divided into groups, each group containing a plurality of differently functioning individual apparatus. Such different types may comprise switching matrixes with path finding and switching matrix setting systems and subscriber connection circuits, identification means, dial signal receivers, internal and external connection sets, registers and the like, and register and/or code conversion systems common to the individual apparatus. These serve in information transmission between the central and individual apparatus in both directions.

In the prior art systems a counting pulse generator is provided for each switching matrix input. For the totality of all the counting pulse generators the prior art systems have generally made available intermediate stores for information exchange with the central control mechanism. These intermediate stores are generally designated as an incoming register. When a connection is established, a counting pulse generator is connected with an intermediate store. If the number of dialed digits received in the intermediate store is sufficient for the completion of a connection, the intermediate store is connected for a short time with the central control. The central control operates to return to the intermediate store information permitting further connection establishment (for example, how many digits are to be suppressed, which are to be charged a tariff, etc.). The intermediate store forwards this information to the connected counting impulse generator or utilizes it in the course of completing a further connection. In such known installations there are further assigned to the different dial stages, and within such stages to the several groups of selectors, a plurality of setting sets. The setting sets are assigned individually per group of selectors. The setting sets serve, as well, as intermediate stores for information communicated between the selectors and the central control. If, from a central control, information is given about the intended destination of the dialed connection to the setting set, the latter accepts this information for the time being. Subsequently, because of this information, the setting set makes a selector setting. In the meantime, the central control has already been separated from the setting sets and is occupied with other similar processes necessary for the completion of the connection. In the devices known in the art it is essential that there be assigned to each counting impulse generator separate intermediate stores and to the selectors other separate intermediate stores. Stating this proposition differently, the different types of individual apparatus must each, respectively, have different types of intermediate stores assigned to them. That is, counting impulse generators must have incoming registers assigned thereto, and selectors must have setting sets assigned thereto. Thus, it has been known in the state of the art that specific stores must be assigned to the different types of individual apparatus. In contrast, however, it is a principle of the invention described herein that a buffer store and/or code conversion device may be utilized which is universal to or, operable with, all types of individual apparatus.

The central controlling of telephone exchange installations forces the consolidation of the exchange systems into complexes as large as possible. For this reason centrally controlled telephone installations have heretofore been installed chiefly at locations with large numbers of subscribers and heavy traffic density in order that the installation of such an expensive central control means pays off. In order to establish the most favorable conditions in this regard, at locations of lesser subscriber density the subscribers of very extended areas would have to be consolidated into exchange offices, thus necessitating relatively longer average subscriber lines.

The invention has as its task the provision of a switching arrangement of the above mentioned type which, detached from the previously explained conditions, permits a division of a centrally controlled long distance communication installation over wide areas. This task is solved through the fact that individual apparatuses are combined into such closed groups in which, according to need, some of the individual apparatuses of the different (preferably all different) types are joined together in each case) and that to these groups one individual buffer storage and/or code conversion system each is assigned which is universal with regard to the different types of individual apparatus and is connected, over a transmission line of the first type, only with the individual apparatus of the group in question.

The invention makes it possible to connect each group of individual apparatus, through a buffer storage or the like, over a joint transmission line of the second type with the central apparatus. This results in the advantage of spatially subdividing economically an extensive centrally controlled exchange installation into partial exchange installations of the smallest measure, and to thereby be able to develop relatively narrowly dimensioned subscriber areas with relatively short average subscriber lines. This subdivision into small partial exchange installations is so economical because the storage and/or recoding systems serving to adapt the individual apparatus and the central apparatus are assigned individually to the mentioned groups and are developed in universal fashion, whereby for cooperation between the individual apparatuses of each group and the central apparatus only one single common data transmission line must be provided. This data transmission line is to be considered as a component of the transmission line of the second type.

Further, the quantitative expansion of the exchange installation can easily be carried out by subsequent addition of new partial exchange installations as each of them works, independently of the others, with the central control means.

It is also possible to functionally broaden the exchange installation according to special needs only partially; that is, only in some of its partial exchange installations. Thus, for example, only in these will the subsequent establishment of conference connections, switch-on connections, call back connections and the like be made possible.

Further the low disturbance susceptibility of an exchange installation according to the invention must be pointed out. Thus groups of individual apparatuses of equal function each (for example, groups of identification means, registers, and the like) with one thereto assigned buffer storage and recoding system, at the failure whereof all individual apparatuses of the group in question would no longer function, are not formed. Instead functionally universal groups of individual apparatuses of different types are formed therefore only the partial exchange installation consisting of this group fails in case of a disturbance of the buffer storage and recoding system assigned to said group. Thereby the problem of distortion susceptibility of centrally controlled exchange installations is solved to a great extent, in that disturbances which occur between individual apparatus and central apparatus are restricted to a small part of the entire centrally controlled exchange installation.

BRIEF DESCRIPTION OF THE DRAWINGS

FIGS. 1*a* and 1*b* comprised a block diagram of a telephone exchange according to the invention;

Figure 1A:
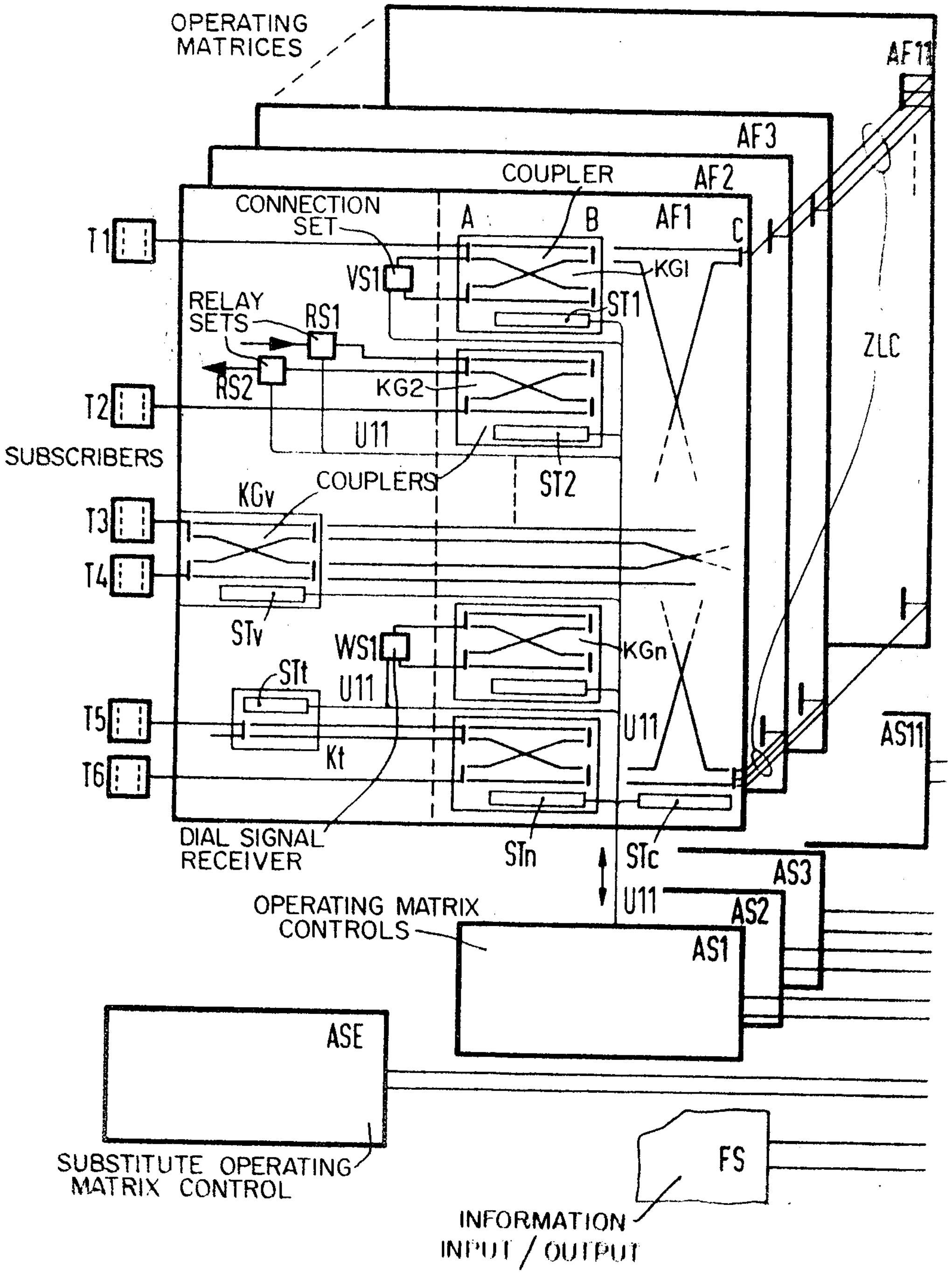

DETAILED DESCRIPTION OF THE INVENTION:

FIG. 1 shows a telephone exchange installation according to the invention having a plurality of groups of operating matrixes AF1 . . . AF11, and AFF. Intermediate storage and recoding systems AS1 . . . AS11 comprise operating matrix control means for operating matrixes AF1 . . . AF11, respectively. The operating matrix control means AS1 . . . AS11 of the exchange installation are connected by transmission lines U2 of the second type with first and second central control means ZS1 and ZS2, respectively. The arrangement of the two central control means serves, in known manner, to increase the operational reliability of the entire exchange installation with regard to the possibility of a misfunction or an interruption of the operation of a central control means. It also functions to supervise errors by comparing two informations supplied independently of one another by the two different central control means. As this is not essential for understanding the invention, a single central control means is usually discussed hereafter.

First data transmission apparatuses D1, D2, . . . , are also connected to transmission lines U2. In each case these form with second individually assigned data apparatuses D1', D2', . . . , respectively and a corresponding connection line, data transmission paths which individually make it possible for distant operating matrixes, for example AFF, to exchange information with central control means ZS1 and ZS2. Data apparatus D2 thus pertains to a second data transmission path and a further (not shown) distant operating matrix. Moreover, it is also possible to provide a common data path for several operating matrixes located at the same distant location.

The operating matrixes each comprise, inter alia, coupling stages A and B of the three-stage switching matrix having coupling groups consisting of individual coordinate couplers, for example KG1 to KG*n* in the instance of operating matrix AF1 and KGF1, KGF2 . . . , in the instance of distant operating matrix AFF. To each coupling group an individual control means, for example ST1 in the instance of coupling group KG1, is assigned, which carries out the setting orders received from the operating matrix control means. In each case one coupling group and its assigned individual control means constitutes an individual apparatus. Further, the entirety of the couplers of coupling stage C with its control means ST*c* are individual apparatus.

It is also possible to combine these couplers in an operating matrix in several individual apparatus having individual control means. Further, connection sets, for example VS1 for connections to be switched-through within the exchange installation consisting of operating matrixes AF1 to AF11, are individual apparatus. Relay sets, for example RS1 and RS2, are individually assigned by connection lines (local and long distance lines) to exchange installations at other locations for arriving and/or departing connections. The individual apparatus also includes dial signal receivers, for example WS1, which serve subscribers for reception of dial information signals; preferred coupling groups, for example KGv having individual control means ST*v;* and preferred one-stage couplers, for example K*t*, having individual control means ST*t*. These preferred coupling groups and one-stage couplers are of an importance which corresponds to the larger and smaller dial star switches known in customary exchange installations. Moreover, not shown subscriber-individual subscriber connection circuits can be arranged as individual apparatus or in groups.

All of these individual apparatuses of an operating matrix for example AF1 are connected, over a network of transmission lines of the first type, for example U11, with the operating matrix control means in question, for example AS1. Each individual apparatus contains connection devices which are controllable by the operating matrix control means. For this, if the requirement for a connection exists in the individual apparatus, a connection impulse is given therefrom to the identified operating matrix control means which leads to the transmission of an order to effect connection to the individual apparatus in question.

The coupling switching devices of several operating matrixes in one location form a single common switching matrix, which is divided, only for reasons which have no causal connection with the grouping of the switching matrix (for example reliability, expansion possibilities, and questions of traffic load) into several applicability areas having several operating matrix control means.

The switching matrix formed from the coupling switching devices in coupling stages A, B and C of operating matrixes AF1 to AF11 is constructed, as is known of couplers in several (preferably three) coupling stages, connected over intermediate lines to the inputs of the first coupling stage. Subscriber lines, connection lines and all inputs and outputs of switching devices necessary for connection establishment and connection supervision for each connection, are similarly connected. Outputs of the couplers of the first until the next to the last coupling stage which are connected individually to the inputs of the couplers of the coupling stage switched subsequently in each case, are connectable in each case in pairs in this subsequent coupling stage. Such a switching matrix is shown and described in British Pat. No. 1,058,893.

The special characteristic of the development of such a known switching matrix resides, according to the above identified stated published application, in the fact that from one switching matrix input the outputs of each of the couplers can be reached over one single connection path at the most. Thereby during pathfinding from the direction of a switching matrix input, through selection of one of these outputs, the path to be switched through over the switching matrix for the desired connection is already clearly fixed. The switching matrix, viewed from its inputs to the outputs of its couplers, is developed in purely fan-shaped fashion. Nevertheless, two switching matrix inputs can alternatively be connected over different paths because there are always accessible, from the direction of the two switching matrix inputs, several common coupler outputs, or several times two coupler outputs each, pertaining to the last coupling stage in different operating matrixes and connected over one intermediate line each.

The operating matrixes, for example AF1, thus possess three coupling stages each, the couplers whereof are connected over intermediate lines in such a way that to one coupler output each in the first to the next to the last coupling stage A and B, one coupler input each in the second to the last coupling stage B and C is individually fixedly assigned. The outputs of the couplers of coupling stage C in all operating matrixes AF1 to AF11 and AFF are at least partially disconnected. In operating matrixes AF1 to AF11 a part of these outputs is individually connected in pairs over intermediate lines ZLC leading from one operating matrix to another.

To the two central control means ZS1 and ZS2 arranged next to each other there are respectively assigned program storage means PS1 and PS2. The central control means read from the program storage means according to which program comprising information transmitted by an operating matrix control means to be processed is received in the central control means. In addition, a common multi-part information storage means ZJS is assigned to the two central control means, the entire storage capacity whereof is available to the two central control means according to the needs in each case.

To the network of transmission lines U2 there is assigned control apparatus FS for the input and output of information by which central control means anisms ZS1 and ZS2 can be reached directly. It is possible through control apparatus FS to check the mode of functioning of the central control means and change the storage contents of program storage means PS1 and PS2 (take out of storage and/or store).

There is further assigned to the network of transmission lines U2 an operating matrix control mechanism ASE, which, in case of a disturbance in one of the operating matrix control means AS1 to AS2, can be connected temporarily thereto as a substitute for it. Thus the operating matrix control means are uniform among one another and can be exchanged for one another.

Figure 2:
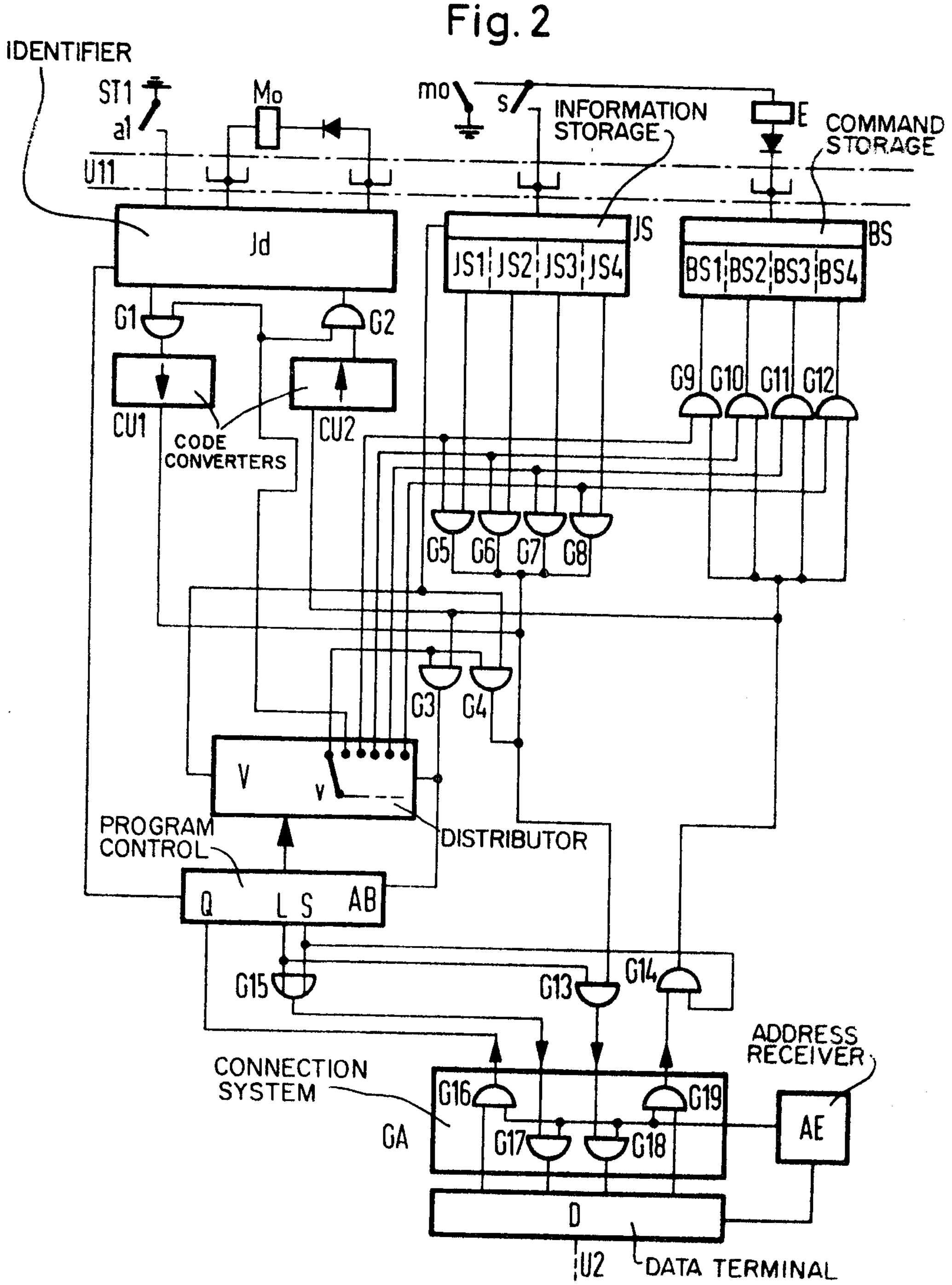
FIG. 2 is a circuit diagram in which the control means of FIG. 1 is shown in greater detail.

FIG. 2 gives further details of an operating matrix control means (AS1) shown in FIG. 1. The operating matrix control means is in connection, over transmission lines of the first type, for example U11, with individual apparatus, for example control system ST1 of coupling group KG1, and over transmission lines of the second type (U2) with the central control means shown in FIG. 1. The operating matrix control means can be requested by individual members, for example coupling group control ST1. With the aid of identification device *Jd*, the operating matrix control means is in a position to select one from several simultaneously present connection impulses, which are actuated over request contacts such as *a*1, and transmit a corresponding order to connect to the connection relay Mo which corresponds to the connection impulse in question.

The request circuits are connected individually to the operating matrix control means from each individual apparatus. However, it is also possible to provide request contacts such as a1 of the individual apparatus ST1 in a coordinate matrix. Thereby the number of request circuits can be reduced substantially and, in the most favorable instance, to twice the square root of the number of individual apparatus served by an operating matrix control means. The connection relays such as Mo of the individual apparatus are located in a control matrix extending over all individual apparatus.

With the aid of contact mo of connection relay Mo, transmission switching device s and receiving switching device E of switching matrix control means ST1 are switched effective. It is pointed out that there are a plurality of transmission switching device s and receiving switching device E of coupling group control means ST1, and that information applied to and from the latter is transmitted over transmission line U11 under a parallel code. This means that the transmission lines connected to transmission switching device *s* and receiving switching device E are of a multi-conductor type. The entire information to be transmitted in each case simultaneously lies at the conductors of multi-conductor transmission line U11.

The transmission lines of the first type, for example U11, do not extend over long distances. Further, relatively inexpensive transmission and receiving switching devices can be inserted because these, utilizing the parallel code transmission method, fully satisfy the speed requirements for the information transmission. Therefore the relatively large number of circuits of the transmission lines of the first type, as well as the transmission and receiving switching devices for connection and transmission, does not present unfavorably high switching and other technical expenses. In the present case the receiving and transmitting switching devices comprise electromagnetic relays, or contacts thereof. However, it is also possible to substitute other equivalent switching devices therefor.

Preparatory to the description of the mode of operation of the operating matrix control means some definitions of terms will be given. As already evident from the above explanation, information is transmitted from the individual apparatus to the central control means, as well as from the central control means to the individual apparatus. In any case, the operating matrix control means serves as an intermediate member. Information transmission from one individual member to the central control means is subsequently always designated as "reading." The reverse information transmission from the central control means to an individual apparatus is always designated as "writing." Accordingly, the criteria "reading" and "writing" are formed in the operating matrix control means.

The criterion "reading" is always formed in the operating matrix control means if a request by an individual member, for example coupling group control means ST1, is present over request contact *a*1 and if all switching processes of preceding functional programs are terminated. However, if no such request by an individual member is present, the criterion "-writing" is formed in the operating matrix control means which expresses the readiness of the operating matrix control means to receive information which may be present in the central control means and is to be transmitted to the said operating matrix control means.

Moreover, it can also be the case that neither a request by an individual member is present that the operating matrix control means is ready to receive information. This operational state exists in the case when an operating matrix control means has not yet completed processing certain information. The operating matrix control means is thus not ready for any kind of information exchange with the central control means. The criterion "block" is then formed in the operating matrix control means.

As is evident from FIG. 1, and as has already been described, two central control means are provided. Accordingly transmission lines of the second type such as U2 are also provided in duplicate. Further, systems and circuits which serve to transmit information are also in part provided twofold in the operating matrix control means. For reasons of simplicity this is not shown in FIG. 2. Further, at different locations comparison arrangements (not shown) are provided. It is thereby possible to supervise the accuracy of information transmission and processing. Furthermore it can be assured, in simple manner, that upon the occurrence of a disturbance at any point of the central information transmission paths, operation of the exchange installation can still be continued. As these advantages of duplicating central parts are known per se, this duplication is shown in the working example only at some points.

A common transmission line U2 is connected from central control means ZS1 to all operating matrix control means. It scans cyclicly and in succession, all operating matrix control means to determine in each case whether the criterion "reading", "writing" or "block" is present. For this purpose each operating matrix control means has a connection system GA. An address receiver AE is assigned to this connection system GA. In order that, during scanning of the operating matrix control means by the central control means, always only one single operating matrix control means is connected, each connection is caused through the transmission of the address corresponding to the operating matrix control means in question from the central control means. (Under no circumstances should this address be confused with the addresses of the individual apparatus described in detail later.)

This address transmission from the central control means to an operating matrix control means for temporary connection of the latter to transmission line U2 can be carried out in different ways. It is possible to assign a separate address line to transmission line U2. The central control means transmits, for the duration required for connection, the address of the operating matrix control means in question. The beginning and end of the connection is determined in simple manner through the beginning and end of the address transmission over the address line.

It is also possible to transmit the address of the operating matrix control means in question which is to be connected to or disconnected from transmission line U2 over the latter. The address receiver of each operating matrix control means must thereby be permanently connected to transmission line U2. The connection and disconnection of the operating matrix control means through its connection system GA in this case is always caused, from the direction of the central control means, through the fact that the address of the operating matrix control means in question is transmitted with an additional criterion "connect" or "disconnect" unto the transmission line U2 from the direction of the central control means to all operating matrix control mechanisms. This connection guarantees that the addresses with the additional criterion in each case will not be confused with the remaining information to be transmitted over the transmission line U2 because only the connection system of the operating matrix control means in question reacts thereto in the desired manner.

If the connection or disconnection of an operating matrix control means to or from transmission line U2 is caused by the central control means, only the address receiver of the operating matrix control means in question reacts and opens or closes the coincidence gates, G16, G17, G18 and G19, of connection system GA.

The criteria "reading," "writing" and "block" are formed in program control AB of the operating matrix control means. The criterion "reading" is transmitted over output L of program control AB, and the criterion "writing" over output S of the program control. The criterion "block" resides in the fact that the criteria "reading" and "writing" are transmitted at the same time. It is, however, also possible to identify the criterion block by the absence of criteria "reading" and "-writing", or to provide a third signal circuit therefor.

The criteria "reading," "writing" and "block" are offered to the central control means. When the central control means causes over connection system GA the connection of an operating matrix control means to transmission line U2, it always receives one of these three criteria. For the transmission of these criteria, special criteria lines can be assigned to transmission line U2. However it is also possible to offer these criteria to the central control means over transmission line U2.

There is also shown in FIG. 2 one of the two end apparatuses D of a data transmission path. As is evident from FIG. 1, it is possible to remotely control operating matrix control means such as AFF from the direction of the central control means. In this case it is suitable to include into the branch of transmission line U2 leading to a remotely controlled operating matrix control means a data transmission path, the end apparatuses whereof are D1 and D1' in FIG. 1. The mode of operation of data transmission lines in itself is not the object of the invention and for this reason is not described in any further detail.

If in an operating matrix control means the criterion "-writing" is present, there is thus transmitted a corresponding criterion to the central control means as soon as the latter causes in already described manner the connection of the operating matrix control means over the connection system GA thereof. If the central control means has stored in its information storage means information to be transmitted to the operating matrix control means in question, it then carries out the transmission of such information to the said operating matrix control means in a manner described in more detail hereafter. However if no such information is present, the central control means causes again in the manner described disconnection of the operating matrix control means from transmission line U2 by its connection system GA.

However if in an operating matrix control means the criterion "block" is present when the central control means causes the connection of this operating matrix control means, the central control means causes in the manner described the disconnection of the operating matrix control means in question, independently from the fact as to whether or not information to be transmitted from the central control means to the operating matrix control means is present.

However, if the criterion "reading" is present in an operating matrix control means, it is also transmitted over gates G15 and G17 upon connection of the operating matrix control means to the central control means. Thereupon the central means returns a criterion to the operating matrix control means which initiates transmission of the information in question from the operating matrix control means over transmission line U2 to the central control means. The information is transmitted in several segments. Each information segment is separately initiated and acknowledged by special criteria. This and the transmission of information in segments will be explained hereafter in more detail.

Each information is subdivided into several information segments. All information is preferably coded in binary code, i.e., the information transmitted over transmission lines U11 and U2 as well as the information temporarily stored in the operating matrix control means and recoded. Recoding in the operating matrix control means is for adapting information transmission on transmission lines of the first type, for example U11 in parallel code, to information transmission on the transmission line of the second type, U2, in series code. The information is transmitted on transmission lines of the first type with the aid of electromagnetic relays and on the transmission line of the second type with the aid of electronic switching devices, for example transistors. The high operating speed of the latter not only serves to decrease the transmission time on central transmission line U2 of the second type, but also makes possible information transmission in the mentioned series code, by reason of which only a few transmission channels are required. In contrast, over transmission lines of the first type, information is transmitted over multi-conductor lines. As these extend only over relatively short distances, and pose no high costs in their multi- conductor construction due to information transmission by means of parallel code, suitable transmission times can also be achieved with electromagnetic relays, or equivalent switching devices that are favorably inexpensive.

Further, as transmission lines of the second type extend over relatively long distances, with the aid of a data transmission path, for example one encompassing the radius of a large city or of a junction exchange office area, series code transmission operating slower compared to parallel code transmission can be employed for information transmission due to the use of electronic transmission and receiving switching devices because the switching time of the latter is smaller by a factor of from four to five tenth powers than that of electromechanical relays. This permits limiting the cost of transmission lines U2 of the second type.

It has already been explained that the information is subdivided into several information segments, the transmission whereof is carried out in segments over the transmission line U2 of the second type with the aid of controlling criteria.

All subscriber information is transmitted simultaneously over the multi-conductor transmission line U11 to the operating matrix control means. Information storage means JS comprises a separate part for each of four information segments: JS1, JS2, JS3 and JS4. Further, command storage means BS provides a separate part for each of the four information segments: BS1, BS2, BS3 and BS4. The different designation of information storage means JS and command storage means BS also indicates that in one case the central control means has "readable" information, and in the other case "writable" commands. These definitions are retained in subsequent portions of the specification.

For transmission on transmission line U2, each information transmission consisting of several information segments, and each command consisting of several command segments is supplemented by a length specification and an address. (These are the addresses of individual apparatus; they should not be confused with the addresses of the operating matrix control means.)

Prior to an information or command transmission, the length data are first transmitted. It indicates the quantitative extent of the subsequently transmitted information or of the command. If the total contents thereof can be expressed by less than four information or command segments, the information or command transmission is limited to fewer information or command segments. Due to prior receipt of prior length data, the receiver in each case, i.e., the operating matrix control means or the central control means knows when the information or command transmission will be completed.

Further an address indication precedes each such transmission. Thus it is always specified beforehand from which individual apparatus an information emanates or for which individual apparatus a command is intended.

It has already been explained that information transmitted is divided into several information segments, with the largest number of such segments being limited to four. The address data immediately preceding the information segments on transmission line U2 may additionally comprise segments, the largest number thereof being limited to two. The length data preceding the address data maximally comprises one segment in the present working example.

The length data, the address data and the maximum of four information or command segments are temporarily stored in equally large groups of binary code elements in the operating matrix control means and recoded and transmitted therefrom or thereto; this recoding can be limited to a conversion parallel/series code or vice versa, and can, together with the intermediate storage form a single common process. The mentioned group of binary code elements is designated a byte. A first byte containing the data concerning length, a second and a third byte concerning the address data, and according to the present working example a maximum of four further bytes containing information or commands in each case jointly form a "word." The transmission of a word over transmission line U2 is controlled with the aid of auxiliary criteria. These auxiliary criteria are "reading" (L), "writing" (S), "block" (L+S), as already described, and "acknowledged" (Q).

It has already been indicated in what manner information to be read by the central control means is transmitted from an individual member, for example switching matrix control means ST1 to the operating matrix control means in FIG. 2. A request over request contact *a1* precedes this transmission. Thereupon this request is identified with the aid of identification means *Jd*. The result thereof is the address of the individual apparatus ST1. This address is maintained available by identification means Jd for transmission to code converter CU1. It also excites, over a coordinate control matrix, connection relay Mo assigned to individual member ST1. With the aid of contact mo of the latter, transmission switching device s, as well as receiving switching device E of the individual apparatus ST1 are switched effective. Over a plurality of circuits of transmission line U11 the entire information present in the individual apparatus is offered, simultaneously, for example in a parallel code transmission process, to information storage means JS of the operating matrix control means. The information is received in partial storage means JS1 to JS4 of information storage means JS, whereupon the coupling group control means ST1 is again disconnected through release of relay Mo in questions.

The information is divided, corresponding to storing in partial storage means JS1 to JS4 of the information storage means, into several bits. Together with the information there is also present the quantitative extent thereof in information storage means JS. The length data is offered to one of the two inputs of gate G4. The individual bits stored in information storage means JS are offered to one input each of gates G5, G6, G7 and G8. Gates G4 to G8 symbolically express here that the information placed at one of their inputs, mentioned in each case, can only be conveyed on when a corresponding signal is placed, in each case over the other input of the gate, for transmission. This signal is connected by distributor V, with the aid of its switching arm *v*, successively to the different gates G1 to G12, so that successively the individual bits can be transmitted; i.e., first the data as to length, then the address and then the information or the command.

Distributor V is controlled by program control AB. From this program control the criterion "writing" (S) is offered, in rest position, to the central control means over gates G15 and G17. As has already been explained, this means with respect to the central control means that the operating matrix control means is ready to receive a command from the central control means. However, if the operating matrix control means was requested by one of the individual apparatus, then as soon as the length data and the address and information are present, stored and ready to be transmitted in the operating matrix control means, corresponding criteria are transmitted to program control AB which cause it to offer the criterion "reading" over gates G15 and G17 to the central control means. If this causes, in its connection cycle, the connection system GA of the operating matrix control means in question to connect this to transmission line U2, the central control means receives first the criterion "reading" (L) of the individual apparatus in question.

Thus the central control means is to receive information from the just connected operating matrix control means. As soon as the central control means is ready to receive, through connection to a free storage line in the central information storage means ZS, it receives the length data, which is already offered by the operating matrix control means on transmission line U2. It is pointed out here that gate G4 of the operating matrix control means was already enabled or opened for transmission of the length data as soon as the program control AB had ascertained that the length data and the address and information segments were present, stored, and ready for transmission in the operating control means. Thus the length data is already present on transmission line U2 when the central control means has caused connection of the operating matrix control means with the aid of connection system GA.

The central control means receives the length data transmitted from the operating matrix control means over transmission line U2. As soon as it has received it, it transmits the criterion "acknowledged" (Q) over transmission line U2 or over a separate criterion line to the operating matrix control means. This criterion arrives in program control AB (Q). Thereupon program control AB transmits, in the already described manner, the criterion "block" to the central control means.

Thereupon the program control AB transmits a switch-forward pulse to distributor V. This switches the distributor switching arm *v* forward by one step. Thereby gate G4 is blocked for transmission of the length data, and gate G1 is enabled or opened for transmission of the address from identification means *Jd* to code converter CU1. As soon as this switching forward is completed, the program control AB disconnects the criterion "block" and connects criterion "reading." This causes the central control means to receive the address data conveyed over gates G1, G13 and G18 unto transmission line U2. As soon as this has taken place, the central control means transmits over the transmission line U2 and acknowledgement through open gate G16 to program control AB. The central control means has received the address. As has already been explained, the address can be transmitted in the form of one or two bytes.

The information segments are transmitted in the same manner after the address, in the form of further bytes from the operating matrix control means towards the central control means. The length data was stored previously in distributor V. Therefore the regular end of information transmission can be determined in the operating matrix control means. As the length data was transmitted to the central control means, the same is also true for the central control means.

After receipt of the last information segment of a word, the central control means returns for the last time the criterion "acknowledged"to the program control of the operating matrix control means. As due to the transmission of the length data in the beginning, the quantitative extent of the information to be transmitted was stored in the operating matrix control means as well as in the central control means, it is possible in simple manner to supervise the proper course of information transmission. If after transmission of one of the information segments no acknowledgment signal is transmitted from the central control means to the operating matrix control means, the latter sounds an alarm in a manner not shown after a predetermined time period has elapsed. An alarm is also sounded if the central control means, instead of the expected criterion "reading," receives the criterion "writing" or "-block" without having already received the number of information segments which was indicated by the length data. In one of the two preceding cases the central control means requested not enough information, and in the other case not enough information was offered to the central control means.

Commands are transmitted from the central control means to operating matrix control means in the same manner as information. It has already been outlined that an operating matrix control means which is ready to receive commands keeps available the criterion "writing" at gate G17 over gate G15. As soon as the central control means causes, in the manner already described over connection system GA, the operating matrix control means to connect to transmission line U2, it receives the criterion "writing" (S). It is assumed that it has stored a command destined for the operating matrix control means. The central control means now transmits over gate G16 the acknowledgement signal (Q) to program control AB of the operating matrix control means. The program control AB as a consequence causes in a manner not shown over distributor V gate G3 to be switched open to pass the first bit expected from the central control means over gates G19 and G14. This first bit again contains the length data which is received by distributor V and stored. It thereby knows after how many switchings forward of its switching arm *v* the command transmission is concluded.

As soon as the program control AB has received the criterion "acknowledged," it disconnects the criterion "writing." First the operating matrix control means processes the length data, thereupon it conveys a switch forward pulse to distributor V which as a consequence thereof switches its switching arm v forward by one step. Thereupon the program control AB again connects the criterion "writing." The last mentioned criterion causes the central control means to now transmit the address of that individual apparatus for which the subsequent information is intended, instead of the length data, over the transmission line U2 to the operating matrix control means. In addition, the central control means transmits the criterion "acknowledged" to program control AB of the operating matrix control means whereupon this, in a manner now shown, causes over distributor V gate G2 to be switched open to pass the second byte expected from the central control means over gates G19 and G14. This byte which contains the address of that individual apparatus for which the subsequent information is intended or a portion thereof is received over code converter CU2 and transmitted over gate G2 to identification means *Jd*. It is thereby converted by code converter CU2. Identification means *Jd* causes over the coordinate control matrix the connection of the connection relay, for example Mo, of that individual apparatus (ST1) designated by the address.

There are now successively received in the same manner, with the aid of the criteria "writing" and "acknowledgment"

the bytes containing the command to be transmitted. These are passed over gates G9 to G12 and received in partial storage means BS1, BS2, BS3 and BS4 of command storage means BS, and stored therein temporarily. Thereafter the central control means causes in the already described manner the operating matrix control means in question to again be disconnected by connection system GA from transmission line U2.

The command stored in command storage means BS is transmitted over a plurality of circuits of transmission line U11, in a parallel code transmission, to receiving switching devices E of individual apparatus ST1. Relay E represents one of many receiving relays provided.

The code converter CU1 or CU2 for a byte pertaining to information or command, in each case containing the address, comprises in conjunction with identification means *Jd* the storage and code conversion system introductorily mentioned here. With regard to the further bytes of a word which contain the information or the command, information storage means JS or command storage means BS represent this storage and code conversion system. The recoding can be limited to a conversion parallel-series code and vice versa, and can form together with the intermediate storage a single common process. Code converters CU1 and CU2 contain on their sides facing connection system GA, electronic transmission and receiving switching devices. The same is true for information storage means JS and command storage means BS.

Moreover, it is also possible to provide and transmit, in addition to the criteria "reading," "writing" and "acknowledgment," further criteria between the central control means and the operating matrix control means and vice versa, with the aid of which transmission of the bytes may be initiated, controlled and terminated.

It is also pointed out that information transmission from operating matrix control means to operating matrix control means, for example the transmission of dial information, is also carried out with the help of transmission line U2 and the central control means. The information in question is transmitted from the operating matrix control means to the central control means, is temporarily stored therein, and subsequently further transmitted from there as command to the other operating matrix control means.

As has already been mentioned, the central control means processes the information transmitted thereto with the aid of a program storage means. However, these processes are of no special importance for the understanding of the invention and are therefore not explained in any further detail.

A variation of the working example is also pointed out according to which the information transmission on transmission line U2 can be varied. It was stated that this information transmission is carried out by means of a series code transmission process. Moreover, it was described that the length data, the address and the information or the command are transmitted in groups of binary code elements. These groups were called bytes. One such byte each is provided for the length data and for the address. However, the information, or the command are subdivided into several bytes. Instead of transmitting the binary code elements of a byte successively over the transmission line, it is also possible according to the mentioned variation to do this simultaneously. The transmission of the binary code elements of a byte is thusly then carried out in parallel code. However, the different bytes are transmitted in succession. Despite this variation of information transmission one must still refer to a series code transmission procedure with regard to transmission of the bytes over transmission line U2.

It will be evident that many minor changes may be made in the apparatus described herein, without departure from the scope of the invention. Accordingly, the invention is not to be considered limited by such description, but only by the scope of the appended claims.

We claim:

1. In a circuit arrangement for a telecommunication exchange installation having central apparatus comprised of central control means and individual apparatus, the latter comprising the following types of apparatus: switching matrices, subscriber connection circuits, dial signal receivers, internal and external connection sets and registers, a plurality of different ones of said types of individual apparatus forming a switching system, said switching system being coupled to said central control means over storage means for reciprocal information transmission between the various types of individual apparatus and said central control means, a first type of transmission line connecting said individual apparatus to said storage means and a second type of transmission line connecting said storage means to said central control, the improvement comprising:

groups of said individual apparatus constituted by a plurality of different ones of said types of individual apparatus and at least one of said storage means being individually assigned to each said group and operable with each of the different types of individual apparatus forming the group thereby facilitating information transmission between said different types of individual apparatus and said central control means.

2. The switching arrangement recited in claim 8 wherein said storage means are connected with said central control means by individual transmission paths.

3. The switching arrangement recited in claim 8 further comprising:

slow-operating transmission and receiving switching devices operatively associated with the first type transmission lines, the latter being multiconductor lines and transmitting information in parallel coded form;

relatively fast-operating transmission and receiving switching devices operatively associated with the second type transmission lines, the latter transmitting information in series coded form.

4. The switching arrangement recited in claim 3 wherein individual information transmissions comprise a plurality of equal size groups of binary code elements.

5. The switching arrangement recited in claim 4 wherein the plurality of groups of binary code elements are transmitted in series coded form.

6. The switching arrangement recited in claim 5 wherein the code elements comprising each group are transmitted simultaneously.

* * * * *